United States Patent [19]

Valentine

[11] 4,376,049
[45] Mar. 8, 1983

[54] DYNAMIC FILTER SYSTEM

[76] Inventor: Philip J. Valentine, 505 N. Yelm, Kennewick, Wash. 99336

[21] Appl. No.: 334,918

[22] Filed: Dec. 28, 1981

[51] Int. Cl.³ ............................................. B01D 33/02
[52] U.S. Cl. .................................. 210/232; 210/297; 210/330; 210/380.3; 210/416.1
[58] Field of Search .............. 210/267, 287, 263, 297, 210/324, 330, 359, 416.1, 232, 360.1, 380.3

[56] References Cited

U.S. PATENT DOCUMENTS

| | | | |
|---|---|---|---|
| 2,408,130 | 9/1946 | Vokes et al. | 210/488 |
| 2,651,416 | 9/1953 | van der Mark | 210/297 X |
| 2,905,326 | 9/1959 | Judson et al. | 210/457 |
| 3,143,581 | 1/1962 | Walter | 261/97 |
| 3,202,284 | 1/1963 | Wade | 210/294 X |
| 3,294,242 | 12/1966 | Notari | 210/347 |
| 3,437,208 | 4/1969 | Kaspar et al. | 210/297 |
| 3,655,058 | 4/1972 | Novak | 210/360.1 |
| 4,107,041 | 8/1978 | Kaazson | 210/267 X |
| 4,132,649 | 1/1979 | Croopnick et al. | 210/347 |
| 4,246,108 | 1/1981 | Croopnick | 210/297 X |

Primary Examiner—John Adee
Attorney, Agent, or Firm—Wells, St. John & Roberts

[57] ABSTRACT

A dynamic filtering system as described in which particulates are separated from a fluid as the fluid is moved by centrifugal force through filtering elements. A rotor mechanism received the fluid initially through a central inlet opening. The rotor is then forcibly rotated so the fluid is forced by centrifugal action out through a series of radially oriented passages. Filter elements are removably secured in the passages to intercept and trap particulates passing through the filter elements. Access to the filter elements is allowed without requiring disconnection of the inlet, discharge or rotor driving mechanisms.

19 Claims, 4 Drawing Figures

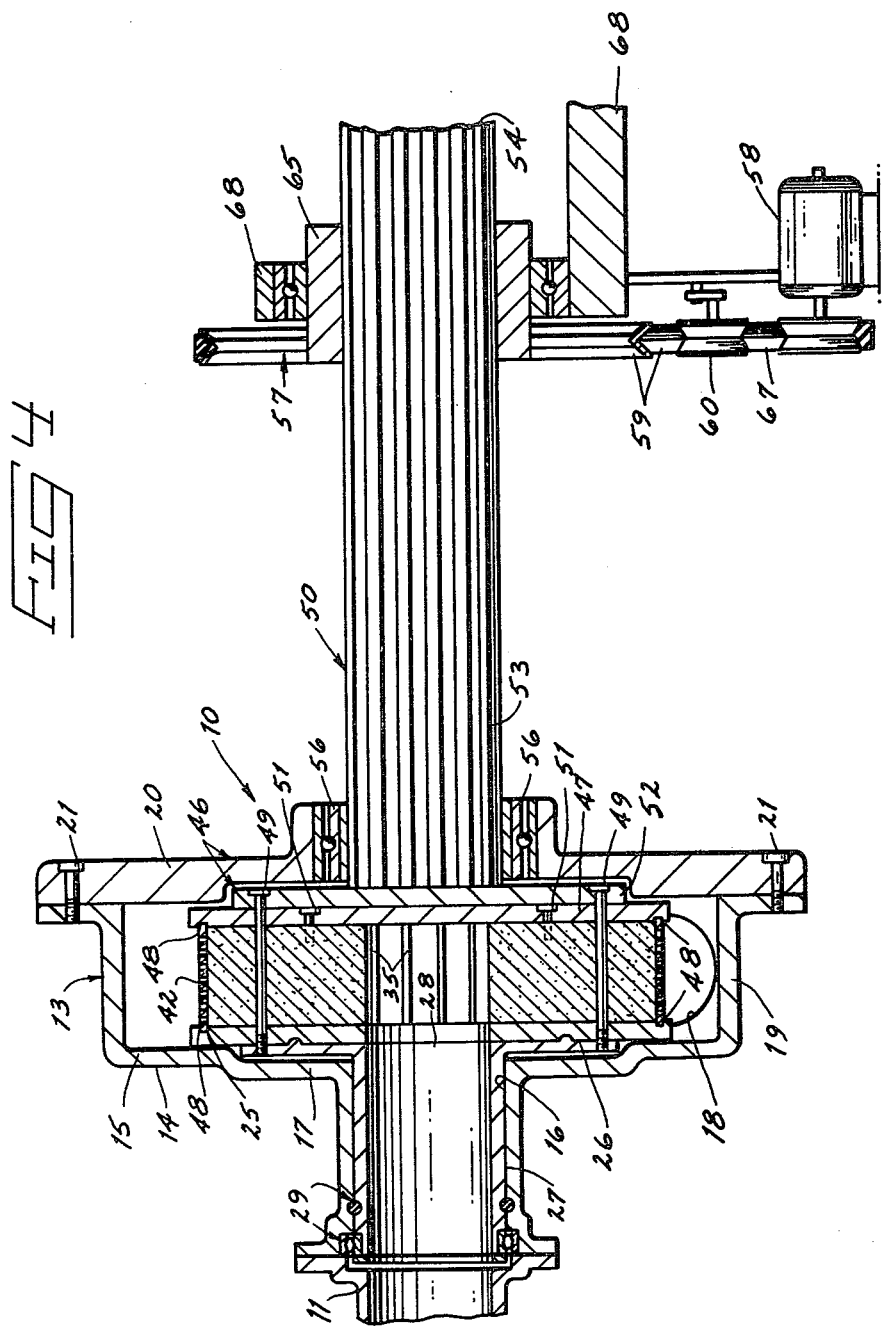

DYNAMIC FILTER SYSTEM

BACKGROUND OF THE INVENTION

The present invention is related to filter systems in general and particularly to such systems for achieving a very high degree of removal of suspended particles from a fluid containing the same.

Fluids are frequently encountered which are highly desirable or useful, but which contain suspended particles which are difficult, expensive or time consuming to remove.

Many present methods of filtration rely often upon pressure to achieve rapid removal of particulates. This requires a high pressure pump, piping, and containers. As a result, leakage, valving, and possible line ruptures constitute an expensive nuisance.

Gravity systems are also employed in which the above mentioned high pressure problems are avoided. However, gravity systems are usually extremely slow. For example, "problem liquids" which are quite viscous, or liquids containing extremely fine suspended matter are not easily filtered by gravity systems. There remains a need for a filtration system by which "problem liquids" and other fluids may be quickly and easily filtered.

A gasket arrangement for purification apparatus is disclosed by Croopnick et al in U.S. Pat. No. 4,132,649. The apparatus disclosed includes a stack of disk shaped filtering membranes and a stack of separating gaskets. The gaskets are fitted between successive membranes to seal the membranes and to space the membranes apart for filtration purposes. The primary thrust of the Croopnick patent is a different and improved way of supporting and separating the membrane packs and the gasket packs.

An external high pressure pump and piping system are required by the Croopnick device to force liquid through the system for purification. The membrane and gasket assembly may be rotated in its housing in order to produce centrifugal forces that aid flow of the fluid. It is pointed out, however, that the rotational energy and resulting centrifugal forces is merely an "aid" to fluid flow. The system still requires an external high pressure feed pump and inlet piping to produce flow through the filtering assembly. High compressive forces are required to hold the purification apparatus together and to minimize leakage.

Croopnick includes two liquid outlets. A permeate outlet is provided to discharge filtered liquid. A concentrate outlet is also provided through which very impure liquid is delivered. The filtering arrangement therefore does not function to entrap and hold all particulate material from the fluid. Instead, collected particulates and a portion of the fluid are collected in a concentrated form. The present dynamic liquid filter system provides its own pumping action and thoroughly cleans the input fluid without collection of a concentrated mixture of the fluid and of particulates. The system is therefore a "one pass" system that will operate quickly and effectively to produce the desired results of fluid filtering at the approximate speed of high pressure systems and with the thorough filtering capability of both high pressure and gravity filtering systems.

BRIEF DESCRIPTION OF THE DRAWINGS

A preferred form of the present invention is illustrated in the accompanying drawings in which:

FIG. 4 is a longitudinal sectioned view of the assembled filter and also illustrating a drive assembly.

DESCRIPTION OF A PREFERRED EMBODIMENT

Figure 1:
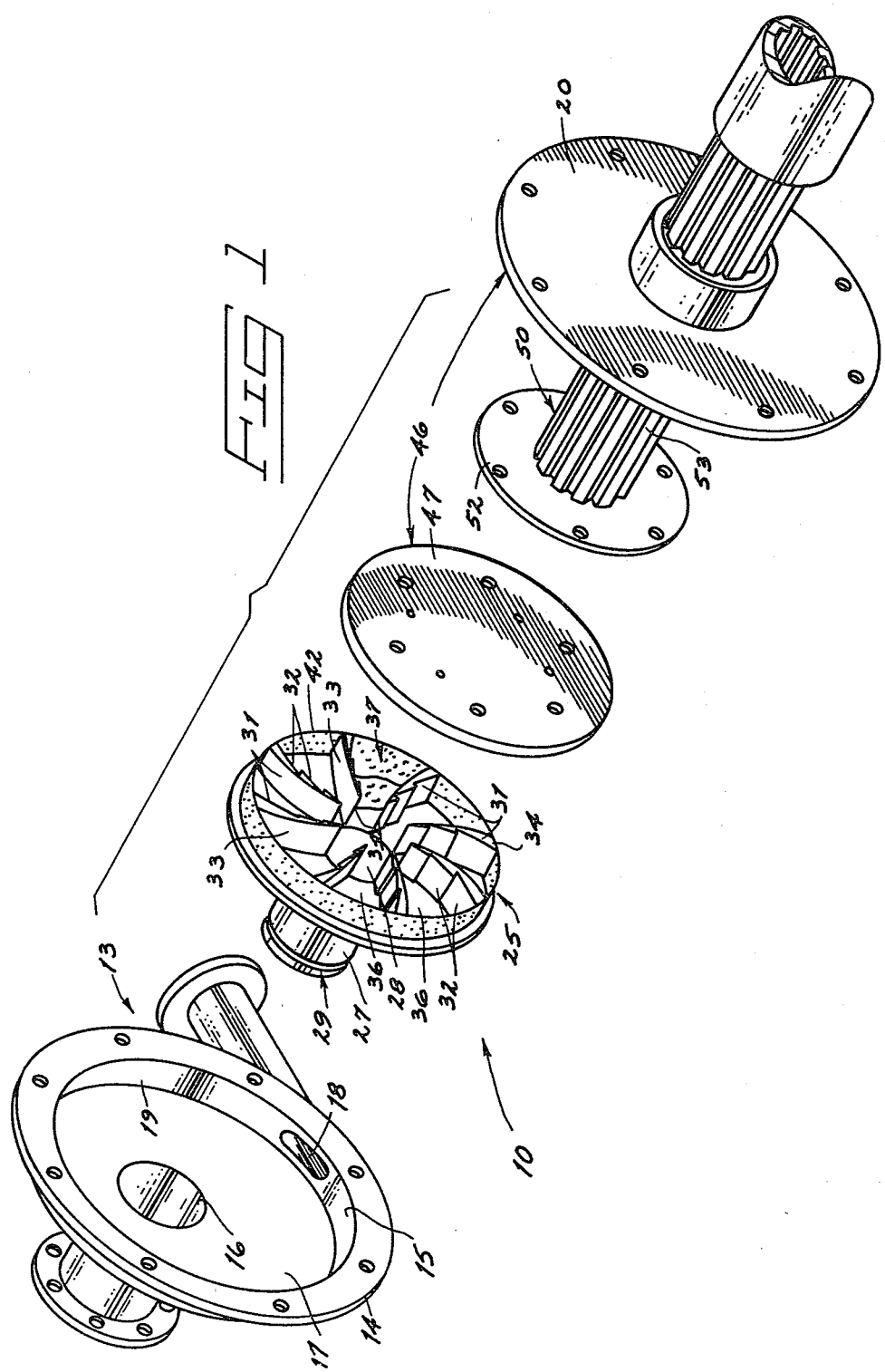
FIG. 1 is an exploded pictorial view of the present filter system.

A dynamic fluid filter assembly embodying the principal features of the present invention is generally designated at 10 in the accompanying drawings. It is intended that the present filter 10 be used to receive fluid from a source such as an infeed pipe 11 as shown in FIG. 4. The pipe 11 can lead from a source of fluid supply such as a tank or reservoir (not shown). There is no need for intermediate pumping stations in order to produce high pressure input of the fluid. The present filter assembly needs only a modest hydrostatic head for priming.

The present filter includes a housing 13 that is adapted for connection to the fluid source 11. The housing 13 includes a first housing member 14. Member 14 defines an interior substantially cylindrical chamber 15 formed on a longitudinal axis. An inlet 16 is formed through an end wall 17 of the housing member. The inlet 16 is centered on an axis that is spaced slightly from the central axis of the chamber 15.

A discharge is provided at 18 in a peripheral side wall 19 of the housing. The side wall 19 is circular and centered on the chamber axis. The discharge 18 is tangential to the circular curvature of the side wall and is approximately perpendicular to the axis of the inlet 16.

A second housing member 20 is mountable to the first housing member 14 by means of bolts 21 (FIG. 4). The second housing member 20 serves to close the chamber 15, allowing flow only through the intake and discharge openings 16, 18.

A rotor means 25 is situated within the chamber 15. Rotor means 25 is journalled for free rotation within the housing about the central axis of the intake. The rotor means is adapted to be forceably rotated in a forward direction (indicated by the arrow in FIG. 2) about the central inlet axis.

Rotor means 25 includes a rotor plate 26 that is journalled within the housing 13 for rotation about the axis. The rotor plate 26 includes an outwardly projecting hub 27 that defines an intake opening 28. This opening communicates directly with the axial inlet port 16 of the housing. Fluid received through the inlet port will therefore be directed also through the intake opening 28. A bearing and seal means 29 is provided to prevent seepage of fluids between the flange 27 and housing inlet 16.

A number of substantially radially oriented vanes 31 are provided on the rotor means 25. The vanes 31 may be integral with the rotor plate 26 or otherwise be secured thereto.

Figure 2:
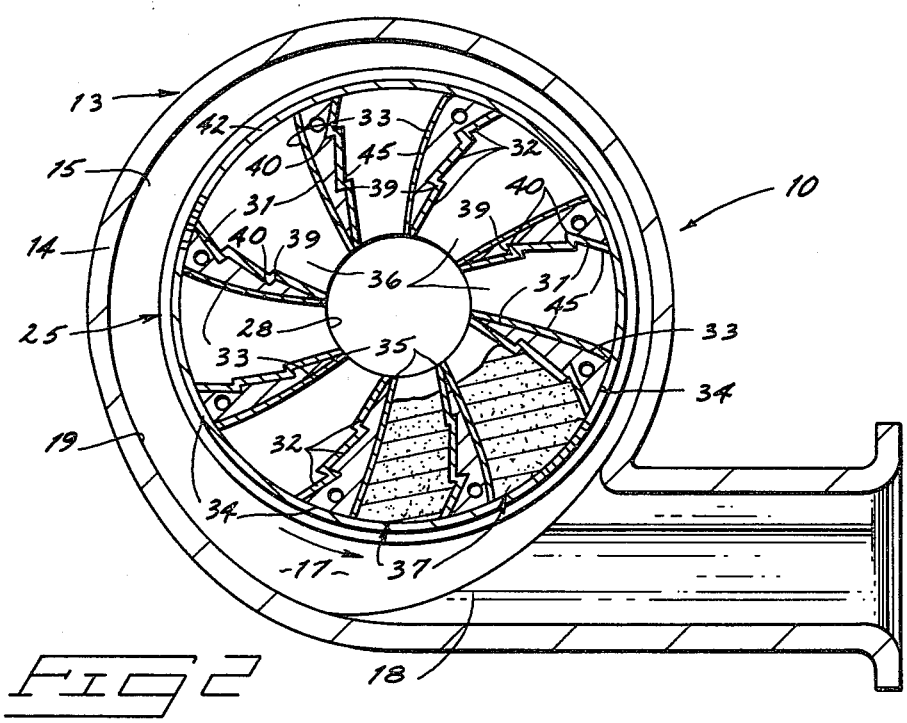
FIG. 2 is a transverse cross-sectional view of the assembled system.

It is preferred that the vanes 31 be curved rearwardly with respect to the forward direction of rotation as shown in FIG. 2. Such curvature enhances the pumping capability of the system as the rotor is rotated in the forward direction.

The individual vanes 31 each include a succession of rearward facing inclined ramp surfaces 32 along one side edge thereof. The opposite or forwardly facing surface 33 of each vane is smooth. The vanes 31 are also convergent or tapered in thickness from radial outer edges 34 toward inner edges 35. The inner edges 35 terminate directly adjacent the intake opening 28.

Successive oppositely facing ramp surfaces 32 and surfaces 33 form passages 36 that lead radially from the intake opening 28. The passages 36 open at the housing fluid inlet and extend substantially radially outward to ends opening into the housing chamber and fluid discharge.

The vanes 31 direct fluid entering through the intake 28 radially outward into the chamber and subsequently out through the tangential discharge 18. Rotary motion of the vanes produces substantial centrifugal force outward from the intake. It is the force produced that tends to accelerate the fluid and any particulates suspended therein through filters 37 that are mounted between successive vanes.

The filter elements 37 are disposed between the vanes and occupy the radially open passages 36. The filter elements are formed of a porous material that will allow flow of fluid outwardly through the passages while entrapping particulates. The filter material can be selected of any standard filtering media and can vary substantially in porosity, depending upon requirements. Examples of appropriate filtering material are sintered metal, porous ceramic, graphite, compacted metal or other "powders", activated carbon, etc.

Figure 3:
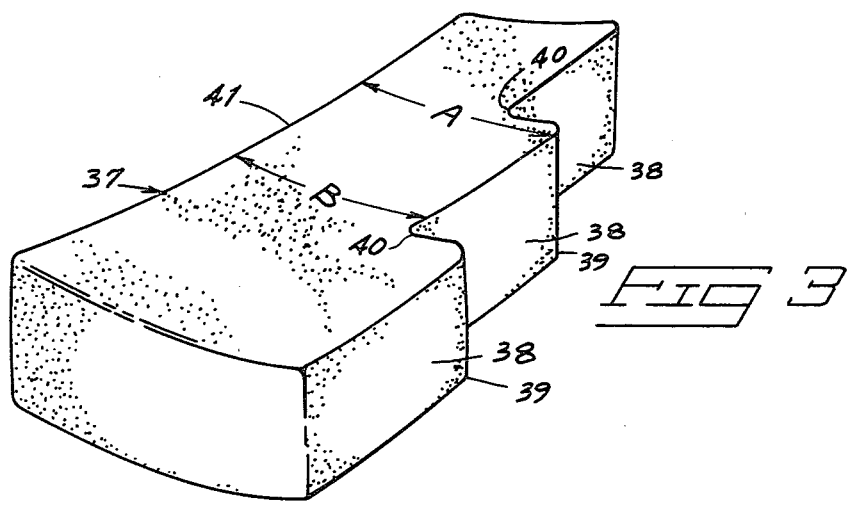
FIG. 3 is an enlarged detail pictorial view of a single filter element for the present invention.

It is preferred that the filters be in a solid form and that they be constructed similar to the configuration shown in FIG. 3 to fit snugly into the passages 36. The filters 37 will therefore include complementary inclined ramp surfaces 38 that match or will mate with the inclined ramp surfaces 32 formed along the vanes.

The ramp surfaces 32 and 38 are provided as centrifugal seal means for seating the filters within the passages and to prevent leakage of fluid around the filter elements. Fluid flow is therefore allowed only through the filter elements 37. The ramp surfaces 32 and 38 include successive ridges 39 and gullets or throats 40 (FIGS. 2 and 3). The ridges 39 of the filter elements 37 are spaced from smooth side 41 by distances ("A") slightly greater than the corresponding distance ("B") between the smooth sides 41 and the throats 40. The seal means may also include rubber strips 45 (FIG. 2) or other resilient material lining the vane surfaces 32 and 33. The strips 45 are preferably non-porous and are partially compressed between the vanes and filter elements.

The ramps of the filter elements will have a tendency to bind or wedge against the similarly shaped ramp surfaces 32 of the vanes during rotary motion of the rotor means. This binding or wedging occurs during rotation because centrifugal force pushes the filter elements 37 radially outward into the passages 36. Thus the filter elements 37 are pressed firmly against the strips 45 to seal against the engaged vane surfaces.

The vanes are sandwiched between the rotor plate 26 and a removable cover plate 47 (FIGS. 1 and 4). The cover plate 47 is complementary in shape to the rotor plate and is detachably mounted for coaxial rotation therewith. The cover plate axially closes the radial passages 36 to confine fluid to passage through the filter elements 37.

The rotor means 25 includes a strong perforated band 42 of stainless steel (or other material which is non-corrosive, strong in tension, and flexible) extending around the circumference or periphery of the plates 26 and 47. The band assists the inclined ramp surfaces in holding the filter core members in place against centrifugal force which tends to throw the segments radially outward and off the rotor. The band may be releasably received in circular grooves 48 in the plates (FIG. 4).

Filter access means is provided at 46 that facilitates removal and exchange of the filter elements independently of the housing inlet and discharge. The filter access means 46 includes the cover plate 47 and housing member 20. The member 20 and cover plate 47 are detachably mounted by means of bolts 21 and 49 respectively or other appropriate removable fasteners to allow relatively free access to the filter elements held within the passages. The access means 46 is also incorporated in a drive connector or shaft means 50 that is adapted to operably connect the rotor means to a rotational driving source such as the motor shown at 58 in FIG. 4.

The drive connector means may include a circular driving flange 52 attached to the rotor means 25 by bolts 49 as seen in FIG. 4. The flange 52 is rigidly fixed to one end of a spline shaft 53. The shaft 53 extends from the flange 52 to an outer remote end 54. A slip seal bearing 56 is provided on the second housing member 20 to rotatably journal the spline shaft 53. The slip seal bearing 56 will also allow axial sliding motion of the second housing member 20 over the spline shaft 53. Thus the inner race of bearing 56 rotates with shaft 53.

Means is provided at 57 as shown in FIG. 4 for connecting the spline shaft 53 to a driving motor 58. Means 57 may be comprised of a relatively conventional pulley assembly 59 connected by another slip bearing assembly 65 to the shaft 53 and by a belt 67 to a motor 58. The slip bearing assembly 65 may be secured to a stationary support 68. The bearing assembly allows rotary motion to be transmitted through the belt and pulley assembly to the spline shaft, and also allows relative axial sliding motion of the spline shaft. Thus the inner race of slip bearing 65 is driven in rotation by motor 58, and in turn drives in rotation and turns with shaft 53. The outer race of bearing 65 remains in stationary contact with support 68.

A conventional clutch arrangement 60 can also be included. The clutch can be used to stop and restart action of the filter without disrupting operation of the motor.

THE INVENTION IN OPERATION

Operation of the invention is initiated by connecting the inlet port 16 with a source of fluid. It is preferred that the fluid source have sufficient "head" to allow free flow of the material through the port and into the rotor means 25. Rotation of the rotor is initiated by activating the motor 58. The preferred direction of rotation is as shown by the arrow in FIG. 2. This direction is termed the "forward" direction of travel and is opposite to the rearwardly bent or curved pointing direction of the individual vanes 31. The vanes guide the fluid progressively outward as the rotor rotates. Centrifugal force builds as the revolutions of the rotor means increase. The fluid is moved radially outward with considerable force through the filter elements. Depending on the porosity of the filter elements, virtually all suspended particles in the fluid may be separated from the fluid as it passes through the filter elements. A pure fluid is thus available through the discharge port 18. Appropriate collection or additional apparatus (not shown) can be provided at the discharge port for further handling of collection of the purified fluid.

During rotation, movement of the core filter segments radially outward (due to centrifugal force) causes each segment to "ride up" the ramps on the successive rotor blade surfaces. The filter elements thus wedge hard against the adjacent ramp surfaces 32 and smooth surfaces 33 of the vanes. Centrifugal force thereby wedges each core segment tightly between its two boundary vanes, preventing fluid from leaking around the outer surfaces of the filter members.

Obviously, the filter elements will eventually become clogged or packed with material so as to slow or eliminate passage of fluid through the system. The present system, however, is provided with removable filter elements that can easily be replaced. In fact, the filter elements can be removed and replaced without requiring detachment of the intake, discharge, or the driving mechanisms.

The filter elements can be removed and replaced simply by detaching the second housing member 20 from the first member 14. This is done by disconnecting the appropriate mounting bolts 21 and sliding the housing member 20 axially along the spline shaft 53 away from the rotor means 25 and first housing member 14 (FIG. 4). Next, the cover plate 47 can be removed from the rotor means by loosening bolts 49 that extend through the cover plate, vanes 31, and rotor plate 26. Both plate 20 and spline shaft 53, can then be slid axially rearward away from the remainder of the rotor means through provision of the slide bearing connection 65 to the driving mechanism.

The filter elements are now exposed and can be relatively easily removed from the complementary passages. New filters can be fitted into the passages and the removal process reversed to bring the filter back to working order.

The above process may or may not involve removal and replacement of the perforated steel band 42 (FIGS. 1 and 4). However, it is predictable that the elements 37 (FIG. 3) will press against the band and that its removal will facilitate removal of the filter elements.

The user will be able to operate the system that may consist of a single motor driving two or more of the filter units by using a disengage clutch arrangement similar to that shown at 60. A clogged unit can then be disengaged and another unit engaged with no interruption of the flow of filtrate.

It is noted that all operations including replacement and removal of filter elements can be accomplished without disconnecting the filter from the driving source, or requiring removal of the inlet and discharge from the filtrate source or the discharge receptacle.

It is also pointed out that though the above description and attached drawings illustrate a preferred form of the present invention, other forms may be envisioned. For example, it is conceivable that the drive connector means 57 be connected through appropriate bearings and seal assemblies to the plate 26, concentrically with the input flange 27, thereby eliminating the spline shaft arrangement. Other changes and modifications may also be envisioned that fall within the scope of the appended claims.

I claim:

1. A dynamic fluid filter, comprising:
   a housing having an axial fluid inlet formed along an inlet axis and a tangential fluid discharge communicating with an otherwise closed chamber;
   rotor means journalled for free rotation within the housing chamber about the inlet axis including passages opening at the housing fluid inlet and extending substantially radially outward to ends opening into the housing chamber and fluid discharge;
   filter elements mounted within the passages;
   seal means between the rotor means and housing preventing access to the housing chamber by fluid except through said rotor passages;
   whereby forcible rotation of the rotor means within the housing results in fluid being drawn through the housing inlet port and forced radially outward by centrifugal force through the passages and filter elements.

2. The filter as claimed by claim 1 wherein the filter elements are removably mounted within the passages and wherein the rotor means includes filter access means facilitating removal and exchange of filter elements independently of the housing inlet and discharge.

3. The filter as claimed by claim 1 further comprising inclined ramp means for seating the filters within the passages to prevent leakage of fluid around the filter elements and allow flow only through the filter elements.

4. The filter as claimed by claim 1 wherein said passages are curved backward in relation to a forward direction of rotation of the rotor means.

5. The filter as claimed by claim 1 wherein the filter elements are porous to allow flow of fluid therethrough and complementary in shape to the passages.

6. The filter as claimed by claim 5 wherein the filter elements are removably mounted within the passages and wherein the rotor means includes filter access means facilitating removal and exchange of filter elements independently of the housing inlet and discharge.

7. The filter as claimed by claim 6 further comprising inclined ramp means for seating the filters within the passages to prevent leakage of fluid around the filter elements and allow flow only through the filter elements.

8. The filter as claimed by claim 5 wherein said passages are curved backward in relation to a forward direction of rotation of the rotor means.

9. A dynamic fluid filter, comprising:
   a housing having an axial inlet port adapted for connection to a source of fluid, and a tangential discharge port;
   a rotor means within the housing adapted to be forcibly rotated in a forward direction about a rotor axis coaxial with the inlet port and including
   a rotor plate journalled within the housing for free rotation about the rotor axis and having an intake opening communicating directly with the axial inlet port of the housing;
   a plurality of vanes on the rotor plate extending substantially radially outward from the intake opening;
   a cover plate over the vanes and facing the rotor plate, to define radially open ended passages between the vanes;
   filter elements disposed between the vanes and occupying said radially open passages; and
   means for transmitting driving forces to rotate the rotor means within the housing about the rotor axis whereby fluid may be drawn through the inlet port and forced radially outward through the filter elements by centrifugal action and subsequently through the discharge port.

10. The filter as claimed by claim 9 further comprising rotor seal means disposed between the rotor means and housing for preventing seepage of fluid through the housing chamber to the discharge port except via the radially open passages and the filter elements contained therein.

11. The filter as claimed by claim 10 further comprising filter seal means between the filter elements and vanes for preventing seepage of fluid through the passages except through the filter elements.

12. The filter as claimed by claim 9 wherein the vanes are curved backwardly with respect to the forward direction of rotation of the rotor means.

13. The filter as claimed by claim 9 wherein each vane is tapered, converging inwardly from an outer toward the intake opening and having a succession of inclined ramps on one side thereof;
   wherein the filter elements include complementary inclined ramps mating with the ramps of the vanes;
   said inclined ramps being oriented such that rotation of the rotor unit will cause the filter element inclined ramps to wedge against the mating ramps of an adjacent vane.

14. A dynamic fluid filter comprising:
   a first housing member having a substantially cylindrical chamber formed about a housing axis and having an inlet port formed through an end wall surface on an inlet axis spaced from the housing axis and a tangential discharge port formed through an integral peripheral side wall;
   a substantially circular rotor plate mounted within the housing adjacent the end wall surface and having a central inlet opening in direct coaxial communication with the housing inlet port;
   sealed bearing means mounting the rotor plate to the first housing member for free rotation therein to prevent fluid from entering between the housing end wall and rotor plate without first passing through the central inlet opening;
   a cover plate detachably mountable to the rotor plate for coaxial rotation therewith;
   vanes sandwiched between the rotor and cover plates, leading substantially radially from the central inlet opening to define passages axially by the plates and radially by the vanes, said passages opening at the inlet opening and at the rotor peripheries;
   filter elements removably received within the passages and occupying the passages so that any fluid moving through the passages will pass through the filter elements;
   shaft means operably connected to one of the rotor plates for transmitting rotative forces to cause rotation of the plate vanes and filter elements in a forward direction about the inlet axis; and
   a second housing member mountable to the first housing member to enclose the plates, vanes and filter elements within the cylindrical chamber and removable to allow access to the plates and filter elements.

15. The filter as claimed by claim 15 wherein the vanes are curved backwardly with respect to the forward direction of rotation of the rotor disc.

16. The filter as claimed by claim 16 wherein each vane is tapered, converging inwardly from an outer radial edge toward the intake opening and having a succession of inclined ramps on one side thereof;
   wherein the filter elements include complementary inclined ramps mating with the ramps of the vanes;
   said inclined ramps being oriented such that rotation of the rotor unit will cause the filter element inclined ramps to wedge against the mating ramps of an adjacent vane.

17. The filter as claimed by claim 15 further comprising a perforated strap extending about the rotor plates and axially joining the plates adjacent the peripheries thereof.

18. The filter as claimed by claim 15 wherein the vanes are fixed to the rotor plate and wherein the cover plate is connected directly to said shaft means for transmitting rotative force to the plates, vanes and filter elements.

19. The filter as claimed by claim 15 wherein said shaft means is comprised of:
   a spline shaft mounted coaxially to the cover plate and extending outwardly therefrom to a remote end;
   a slip seal bearing on the second housing member receiving the spline shaft and allowing both free rotation of the spline shaft relative to the second housing member and free axial sliding motion of the spline shaft relative to the second housing member; and
   means at the remote end of the spline shaft adapted for connection to a source of rotative forces.

* * * * *